Jan. 23, 1968     P. R. O'BRIEN     3,364,559

PRODUCING WROUGHT METAL BAR

Filed June 15, 1965     9 Sheets-Sheet 1

Fig 1.

INVENTOR
PAUL R. O'BRIEN

BY *Glenn, Palmer & Matthews*
ATTORNEYS

Jan. 23, 1968    P. R. O'BRIEN    3,364,559
PRODUCING WROUGHT METAL BAR
Filed June 15, 1965    9 Sheets-Sheet 3

INVENTOR
PAUL R. O'BRIEN

BY *Glenn, Palmer & Matthews*
ATTORNEYS

FIG 9.

INVENTOR
PAUL R. O'BRIEN

INVENTOR
PAUL R. O'BRIEN

BY Glenn, Palmer & Matthews
ATTORNEYS

Jan. 23, 1968  P. R. O'BRIEN  3,364,559
PRODUCING WROUGHT METAL BAR

Filed June 15, 1965  9 Sheets-Sheet 8

Fig. 19.
STAND 7

Fig. 20.
STAND 8

Fig. 21.
STAND 9

Fig. 22.
STAND 10

INVENTOR
PAUL R. O'BRIEN

BY Glenn, Palmer & Matthews
ATTORNEYS

United States Patent Office 3,364,559
Patented Jan. 23, 1968

3,364,559
PRODUCING WROUGHT METAL BAR
Paul R. O'Brien, Chesterfield County, Va., assignor to Reynolds Metals Company, Richmond, Va., a corporation of Delaware
Filed June 15, 1965, Ser. No. 464,156
13 Claims. (Cl. 29—420.5)

ABSTRACT OF THE DISCLOSURE

Heated metal particles are rolled or otherwise compacted into a star-shaped or other bar having outwardly extending legs. The bar is then subjected to a series of roll passes whereby the outwardly extending legs are inwardly shortened until a circular or other desired cross-sectional shape is achieved. The outer, less compacted portions of the legs of the initial bar may be trimmed to facilitate subsequent rolling.

---

This invention relates to methods and apparatus for producing wrought metal "bar," i.e., pieces of metal thicker than sheet, and long in proportion to their width or thickness, as for example, squares and rounds.

Various known processes for producing metal bar involve initially casting relatively large ingots from the molten metal and thereafter working and deforming the metal by suitable methods (e.g., rolling or extruding) in order to improve its physical properties, elongate it, and form it into the desired shape. The casting of large ingot by intermittent, mold casting is usually prohibitively slow, and frequently will not produce an acceptable ingot. Even where continuous casting is used, considerable care is required in order to avoid defects caused by splitting or cracking, segregation, liquation, cold-shutting, coarse grain structure, and the like. Moreover, continuous casting of relatively large ingot requires large and expensive equipment and for practical reasons is usually only "semi-continuous," since the cast ingot must be periodically severed and removed for subsequent operations. The rolling of ingot is normally a non-continuous operation and requires massive and expensive equipment, for example, breakdown mills for hot-rolling ingot into slab. In addition, reheating the ingot to hot rolling temperature is time-consuming and expensive, and subsequent cold-rolling may require the inclusion of periodic annealing treatments to soften the metal. Of course, cast ingot may be extruded rather than rolled, but extrusion is slow, can impart only a limited amount of work to the product, often results in non-uniform working of the metal, requires complex and expensive equipment, and with many metals must be non-continuous.

Also known are other processes, for example, "Properzi" processes, wherein molten metal is continuously cast into ingots of relatively small cross-section and, in the same continuous operation, rolled or drawn into bar. Such processes, however, often allow unacceptable alloy segregation, so that in practice their usefulness is limited to only certain alloys. In addition, such processes are quite slow. Further, because of the absence of the preliminary working which would result from breaking down a relatively large cast ingot, the physical properties of bar produced by such processes may be limited; consequently, where high electrical conductivity is desired, the product frequently cannot be stress-relieved (to reduce lattice strain and thereby increase electrical conductivity) without reducing the physical properties back down to unacceptable values.

On the other hand, there are certain known processes for consolidating metal particles into wrought metal strip or sheet, as for example by rolling metal particles which are coarser than a minimum size. Such processes, however, are not always suitable for rolling relatively thick bar, since the compaction and welding caused by the pressure of the rolls may be unduly confined to the portions of the bar near the surfaces. Consequently, the central portions of such relatively thick bar may be insufficiently worked to have the required metallurgical and physical properties, i.e., strength, hardness, and electrical conductivity, and may have undispersed oxide coatings or even voids between the insufficiently welded particles.

The present invention provides a system for converting metal particles directly into high quality metal bar by a simple, flexible, and easily controlled continuous process, thereby avoiding both the disadvantages of producing bar by initially casting metal ingot and existing limitations concerning the thickness of bar which may be produced by consolidating metal particles. This system involves deforming the metal directly into a preliminary elongated configuration having a plurality of outwardly extending legs which are subsequently compressed and deformed inwardly.

The system of the present invention eliminates many of the intermediate operations heretofore believed necessary to the making of metal bar, and reduces substantially the amount and size of equipment, crew size, power, and time normally required. The inventive system also provides for a relatively large amount of working, thereby improving the physical characteristics of the resultant product. Where high electrical conductivity is desired, this high degree of working enables the product to be stress-relieved to reduce lattice strain without fear of losing important physical properties. In addition, in the production of metal alloy bar, the use of particles minimizes alloy segregation, thereby allowing the system to be used with a wide range of alloys. Other advantages of converting metal particles directly into continuous lengths of metal are known in the art, as for example U.S. Patent 3,076,706 which is concerned specifically with aluminous metal.

The system according to the present invention will be described by way of examples wherein cast aluminous particles are converted into aluminous metal bar; various known details pertinent to such examples, such as descriptions of the particles and of the process conditions for consolidating them, may be found in the above-mentioned U.S. Patent 3,076,706. It will be understood, however, that the process of the present invention may be employed to produce metal bar from particles made by other suitable methods and particles of other metals, etc. lead, zinc, nickel, copper, iron, magnesium, and beryllium, and various alloys thereof.

For a better understanding of the invention, and of its other details, objects, and advantages, reference is now made to the accompanying drawings, which show, for purposes of illustration only, present preferred embodiments of the invention.

The overall system

Aluminous particles suitable as a starting material for the present invention may be formed by various techniques, as for example, by centrifugal casting whereby molten aluminous metal is continuously poured into the top of a cylindrical pot revolving about a vertical axis and having side openings through which the molten metal is thrown radially outwardly from the pot by its centrifugal action. The particles at least partially solidify in the air and can be either fully air cooled or caught in a container of water. Substantially all of the particles should be coarser than 200 mesh.

Figure 1:
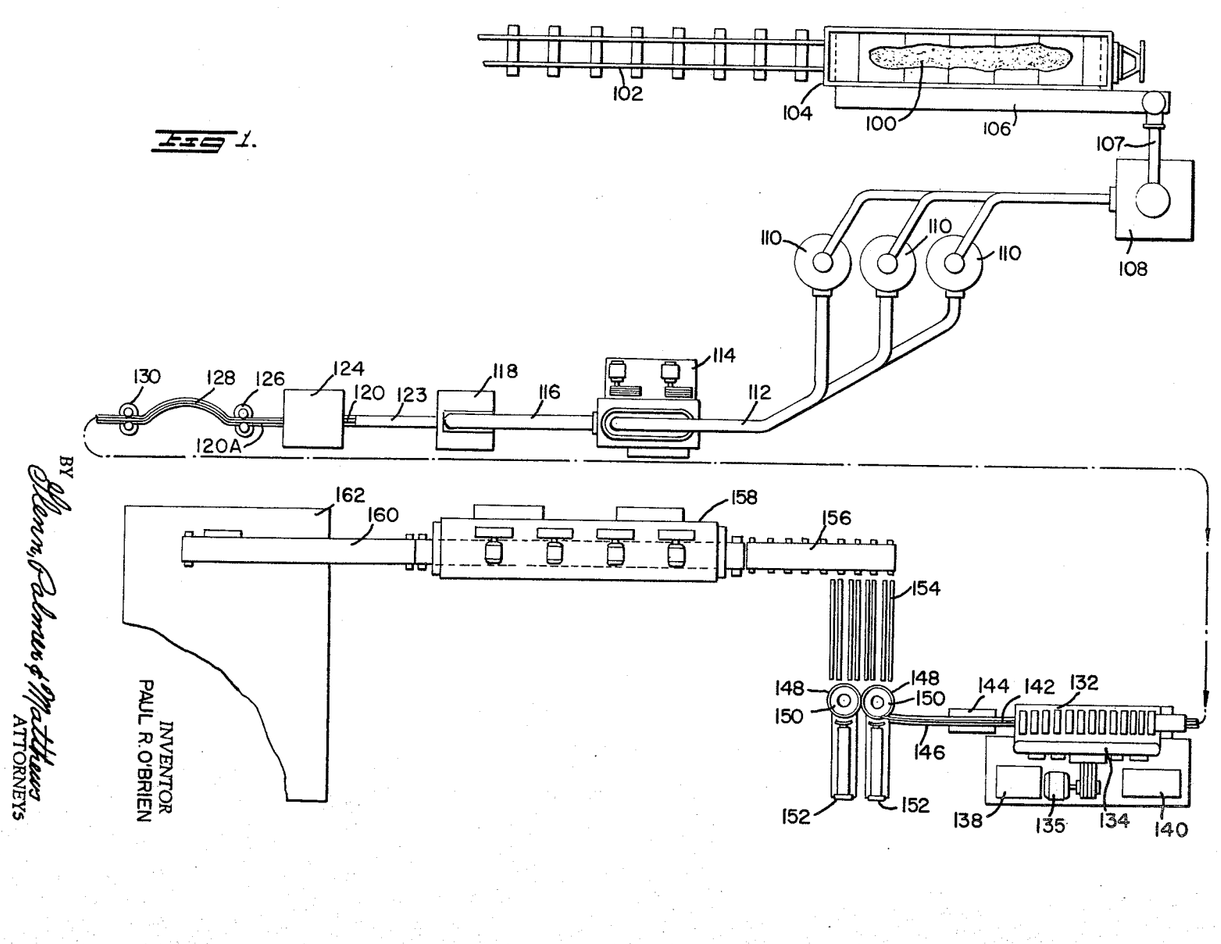
FIGURE 1 is a semi-diagrammatic plan view of an overall system according to the invention.

The layout of the overall system according to the invention is shown in FIGURE 1. The cast particles 100 of aluminum alloy arrive via rails 102 in covered hopper car 104 and are unloaded through hoppers into collector unit 106 having a screw conveyor. Rotation of the screw conveyor delivers particles 100 to pneumatic conveyor 107, which transfers particles 100 through electrostatic cleaner and air filter 108 into three parallel-connected, 200,000 pound pellet storage units 110. Particles 100 are then conveyed through pneumatic conveyor 112 into the top of 60 foot vertical pellet heating furnace 114, where they are preheated to a temperature of between about 450° F. and their incipient melting temperature, which in practice will be in the range of about 1000° F. to 1200° F., the particles preferably being preheated to a temperature close to this incipient melting temperature. (Where certain metals other than aluminous metals are used, the preheating step may be omitted, as is known in the art.) Leaving the lower end of furnace 114, the heated particles 100 are pneumatically conveyed by conveyor duct 116 into the top of vertical tangential compacting mill 118, which is described below in greater detail. Within mill 118, particles 100 are compacted into a continuous and substantially self-sustaining star-shaped section 120 which emerges downwardly from the bottom of mill 118 into guide tube 123. Guide tube 123, having a 90 degree arcuate shape, guides section 120 into a horizontal position. Section 120 now is pulled through tangential trim station 124, which is described below in greater detail, by tension pinch rolls 126 located therebeyond. Cutters within station 124 trim the insufficiently compacted metal from the ends of the legs of section 120, producing trimmed section 120A. (Alternatively the trimming can be performed by stationary cutters immediately adjacent compacting mill 118, or may be dispensed with altogether.) Emerging from between rolls 126, section 120A takes the form of a downward loop 128 before entering between idler guide rolls 130. (A horizontal loop is shown for ease of illustration.) Section 120A now enters modified Properzi No. 7 or Kocks type tandem breakdown mill 132 driven through gearbox 134 by 500 horsepower electric motor 135 and provided with lubricating oil reservoir 138 and rolling oil reservoir 140. (Alternatively, the breakdown mill may be driven by smaller, individual synchronous motors connected directly to drive shafts of each individual roll stand.) Mill 132 and the series of operations it performs will be described below in greater detail. Section 120A is converted by mill 132 into wrought, densified, continuous ⅜ inch diameter redraw rod 142. Flying shear 144 periodically severs rod 142 into suitable lengths which after passing through guide trough 146 are wound by one of two basket coilers 148 onto coil 150. Completed coils 150 are pushed by hydraulic coil push-off cylinders 152 onto walking beam transfer units 154. Units 154 carry coils 150 over to inclined gravity roller conveyor 156, which in turn allows coil 150 to enter conveyorized, electric-, oil-, or gas-fired furnace 158. Redraw rod 142 is stress-relieved within furnace 158 at a temperature of about 350° F. to 450° F. for about 35 minutes. Upon emerging from furnace 158, coils 150 are carried by endless belt conveyor 160 to shipping and storage area 162, where they are removed from conveyor 160. Redraw rod may then be shipped to another location for subsequent drawing into wire. (Alternatively, redraw rod 142 can be drawn into wire immediately after emerging from breakdown mill 132, thereby permitting the production of an end product from metal particles in a single continuous operation.)

Although the system has been described above with respect to producing ⅜ inch aluminous redraw rod, it will be apparent to those skilled in the art that it can be similarly employed to produce bar of other types, shapes, sizes, and materials.

The compacting mill

Figure 2:
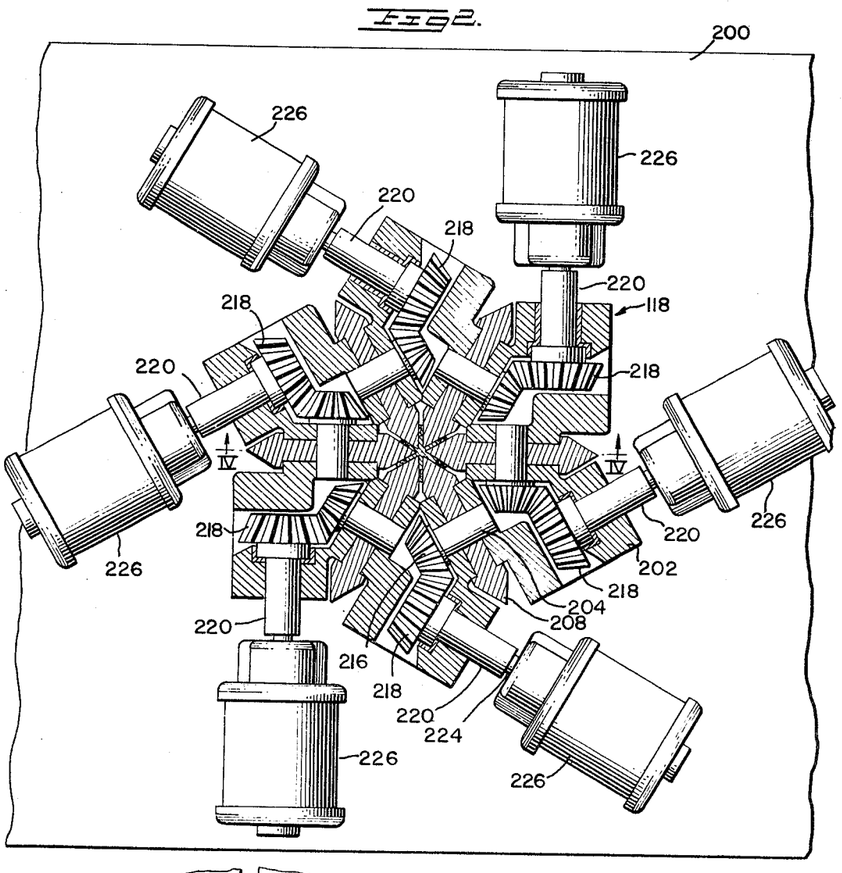
FIGURE 2 is a semi-diagrammatic, sectional plan view of a tangential compacting mill according to the invention.
Figure 3:
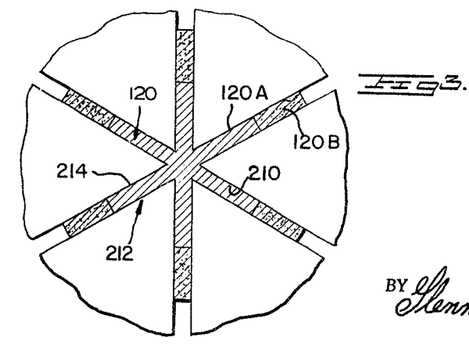
FIGURE 3 is a fragmentary, enlarged detail view of the pass of the tangential compacting mill shown in FIGURE 2.

Compacting mill 118 is shown in FIGURES 2 to 7. Referring initially to FIGURE 2, base plate 200 supports frame 202 of bearing quality cast bronze. Rotatably mounted within frame 202 are six roll spindles 204 each secured to a hardened and ground high-strength tool steel roll 208. Each roll 208 has a compacting surface 210, which is preferably satin-finished, but may simply have a ground finish. Each compacting surface 210 is defined by a pair of conical frustums each having a conical angle of 60 degrees and a maximum, 8¼ inch diameter base in common, as shown in FIGURE 3. Compacting surfaces 210 define a star-shaped pass 212 whose outwardly extending legs 214 are about 0.100 inch thick. Attached to each roll spindle 204 is a bevel gear 216 which meshes with bevel gear 218 connected through shaft 220 and a splined coupling to shaft 224 of variable speed synchronous electric motor 226. Being electrically synchronized with one another, motors 226 drive all rolls 208 at the same speed in direction 228 so that compacting surfaces 210 converge above pass 212 and move downwardly therethrough.

Figures 4, 5:
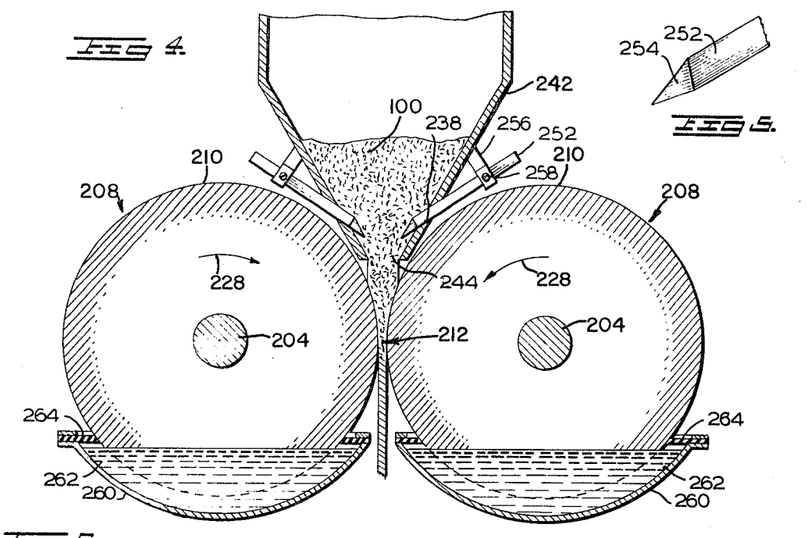
FIGURE 4 is an enlarged, fragmentary vertical sectional view along IV—IV in FIGURE 2 with parts shown in elevation.
FIGURE 5 is a transverse view of a detail shown in FIGURE 4.

As shown in FIGURE 4, hopper 242, in which may be insulated and electrically heated, is supported by suitable structure (not shown) so that its 1¼ inch diameter discharge opening 244 is disposed about 2⅛ inches above, and in alignment with, pass 212. Six triangular knives 252 with pointed ends 254 are slideably mounted, one over each roll, within correspondingly shaped openings in hopper 242 and brackets 256 fixed thereto. Tightening of set screw 258 in bracket 256 fixes knife ends 254 at the desired protrusion within the interior of hopper 242. The bottoms of rolls 208 are submerged in troughs 260 containing liquid coolant 262, such as water, with gaskets 264 attached to the tops of troughs 260 closely fitting against the roll surfaces. (Alternatively, nozzles may be mounted on base plate 200 for impinging a coolant spray against the compacting surfaces 210 at the bottom of rolls 208.)

Figure 6:
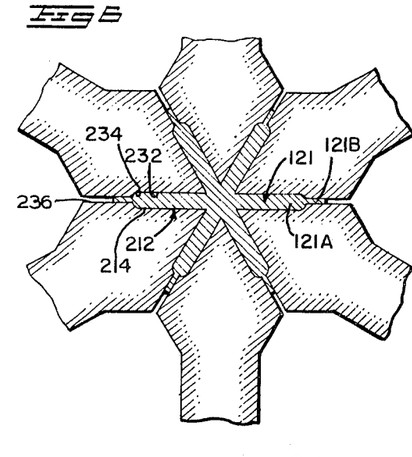
FIGURE 6 is a view similar to FIGURE 3, but showing an alternate embodiment of the invention.
Figure 7:
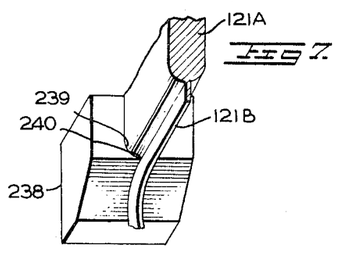
FIGURE 7 is a transverse view of trimming means used in connection with the alternate embodiment of the invention shown in FIGURE 6.

In the alternate embodiment of compacting mill 118 shown in FIGURE 6, compacting surfaces 232 are not entirely conical, but are curved at 234 inwardly toward the adjacent roll to define the ends of legs 214 of star-shaped pass 212 and to provide pinching surfaces 236. Pinching surfaces 236 of adjacent rolls are spaced only about 0.03 inch apart. When this alternate embodiment is used, stationary cutters or skiving knives are mounted immediately beyond the ends of legs 214 of star-shaped pass 212 with horizontally curved guiding surfaces 239 aligned with the curved portions 234 of compacting surfaces 232 of adjacent rolls, and cutting surfaces 240 located therebetween. Cutters 238 may be cooled by suitable sprays (not shown).

Figure 8:
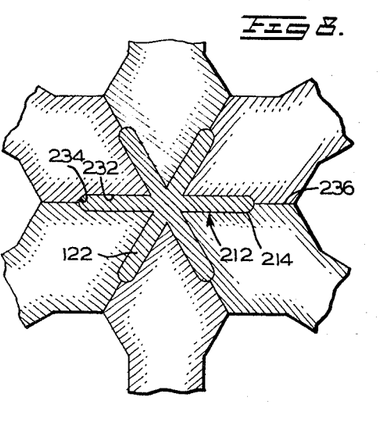
FIGURE 8 is a view similar to FIGURE 6, but showing another alternate embodiment of the invention.

In another alternative embodiment of compacting mill 118 shown in FIGURE 8, the compacting surfaces 232 are curved inwardly at 234 similar to those shown in FIGURE 6 to provide pinching surfaces 236. Pinching surfaces 236 of adjacent rolls, instead of being spaced, are in abutting contact. This embodiment does not require subsequent cutters or trimmers.

It will be understood that in the tangential compacting mill the number, shapes and sizes of the rolls may be varied, and that different power sources and transmissions can be used to drive the rolls, without departing from the invention.

In the operation of tangential compacting mill 118, pre-heating particles 100 are loaded into hopper 242, where they are maintained at a temperature of between 450° F. and their incipient melting temperature, and preferably are maintained very close to the incipient melting temperature. The roll speed may vary from about 30 surface feet per minute (s.f.m.) to about 1000 s.f.m., with the range of 250 s.f.m. to 500 s.f.m. being preferred. Of course for the sake of efficiency the roll speed should be as great as possible for a given set of conditions, e.g., particle size, the alloy or metal thereof, and preheat temperature. With the rolls operating so as to converge inwardly below hopper discharge opening 244, particles 100 flow by gravity downwardly through hopper 242, and are discharged through opening 244 just above the bight of the converging roll compacting surfaces 210. Knives 252 may be adjustably positioned to provide the optimum flow pattern for such a given set of conditions. Compaction, crushing, and welding of particles 100 begin immediately, with the converging compacting surfaces 210 steadily urging particles 100 toward the ultimate configuration of the star-shaped pass 212. During this time pellets 100, because of the thin legs 214 and relatively large perimeter of pass 212, are subjected to increasingly intense kneading forces. The compacted pellets emerge downwardly from pass 212 in the form of a continuous and substantially self-sustaining star-shaped section 120 having the same shape as pass 212. Section 120 consists of a central, thoroughly compacted and welded portion 120A, and an outer portion 120B at the ends of the legs which was prevented by lateral spreading from becoming adequately compacted and welded. Coolant 262 cools compacting surfaces 210, while gaskets 264 confine coolant 210 to troughs 260 and permit it to be pressurized.

In the alternative embodiment of compacting mill 118 shown in FIGURE 6, the curved portions 234 of compacting surfaces 232 serve further to force pellets 100 inwardly toward the center of pass 212, while only a thin strip of material can flash between adjacent pinching surfaces 236. This small amount of flashing tends to insure adequate fill within pass 212.

This forms a continuous and self-sustaining star-shaped section 121 consisting of a central portion 121A and an outer, much thinner portion 121B at the ends of the legs. Cutting surfaces 240 of stationary cutters 238 immediately trim portion 121B from portion 121A, whereupon the trimmed portion 121B becomes scrap from which new pellets 100 can be cast.

In the alternate embodiment of compacting mill 118 shown in FIGURE 8, the curved portions 234 of compacting surfaces 232 serve more powerfully to force pellets 100 inwardly toward the center of pass 212. Only thoroughly compacted and welded portion 122 is produced, there is no scrap, and no subsequent trimming is required.

It will be noted that in the embodiments of compacting mill 118 shown in FIGURES 3, 6, and 8 the amount of lateral spreading is progressively reduced: the embodiment of FIGURE 3 allows a substantial amount of scrap 120B, the embodiment of FIGURE 6 allows a lesser amount 121B, and the embodiment of FIGURE 8 allows no scrap at all. Although obviously desirable, this reduction in lateral spreading places additional strain upon curved portions 234 of compacting surfaces 232, and, ultimately, upon rolls 208, their spindles 204, frame 202, drive mechanism 216, 218, 220, etc. Consequently the embodiment of FIGURE 6, and the embodiment of FIGURE 8 to an even greater extent, necessitate using sturdier apparatus; moreover, rolls 208 should be of a greater diameter in order that particles 100 be more gradually urged into the configuration of pass 212.

*The tangential trim station*

Figure 9:
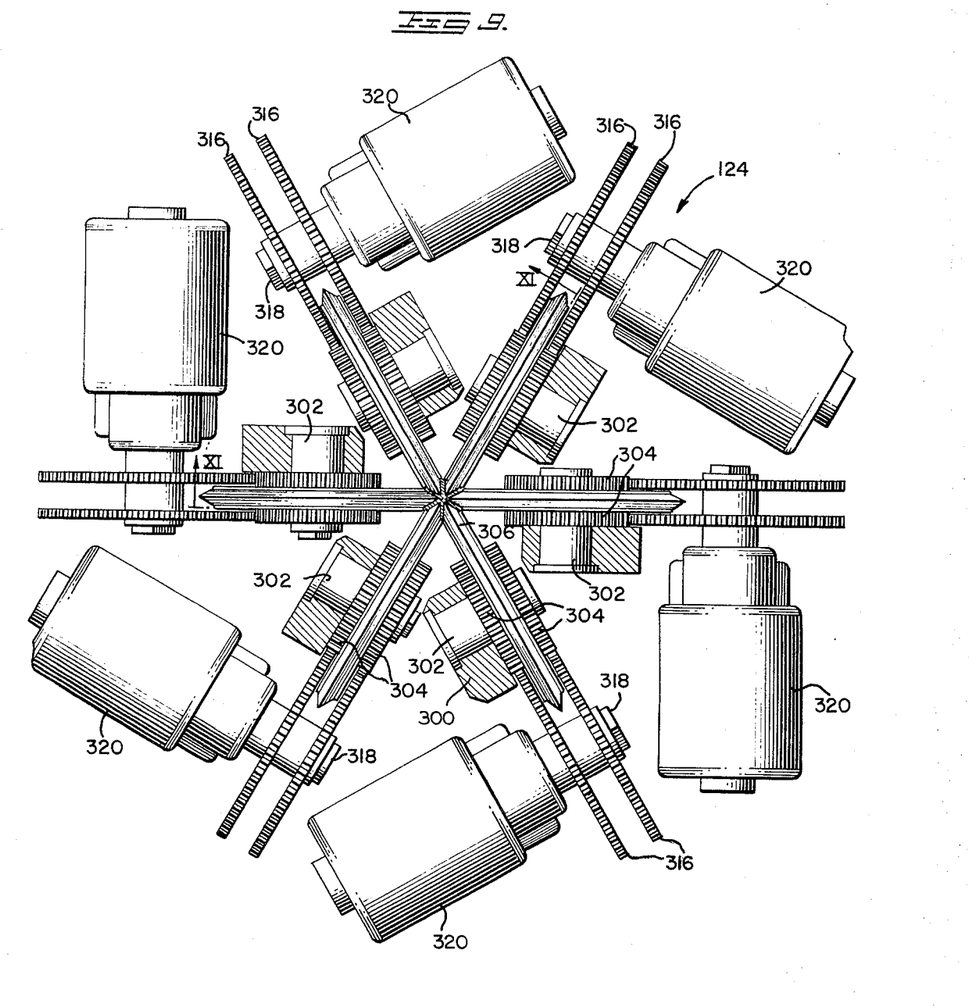
FIGURE 9 is a semi-diagrammatic, sectional elevation view of a tangential trim station according to the invention.
Figure 10:
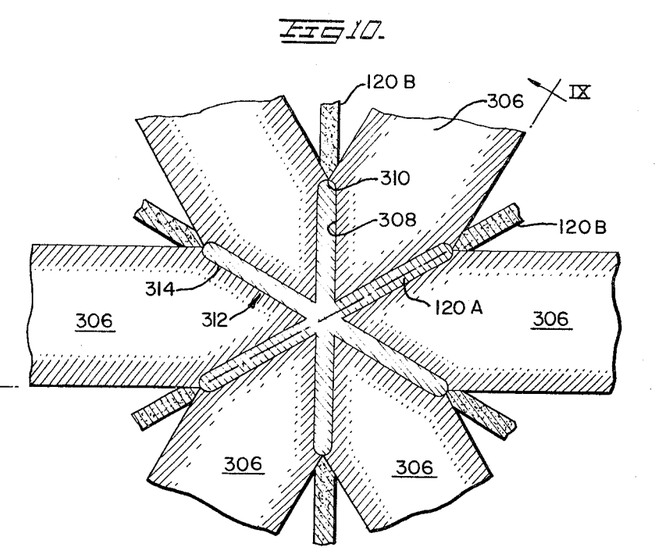
FIGURE 10 is a fragmentary, enlarged detail view of the pass of the tangential trim station shown in FIGURE 9.
Figure 11:
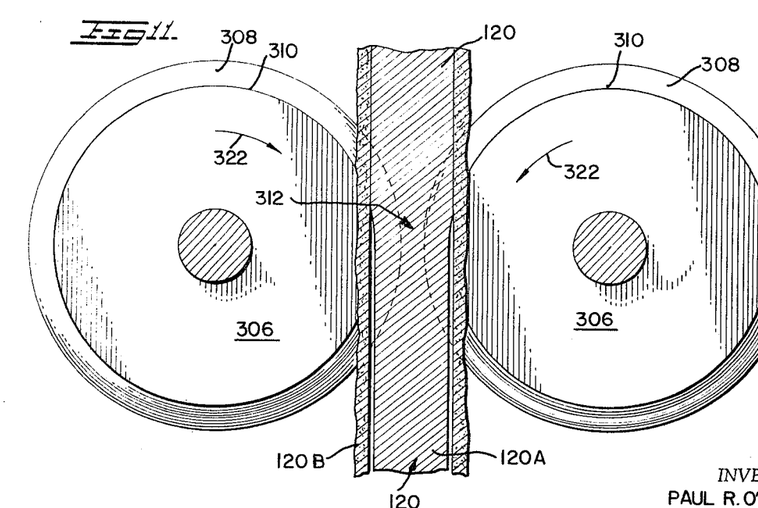
FIGURE 11 is a fragmentary section along XI—XI in FIGURES 9 and 10.
Figures 12, 13, 14:
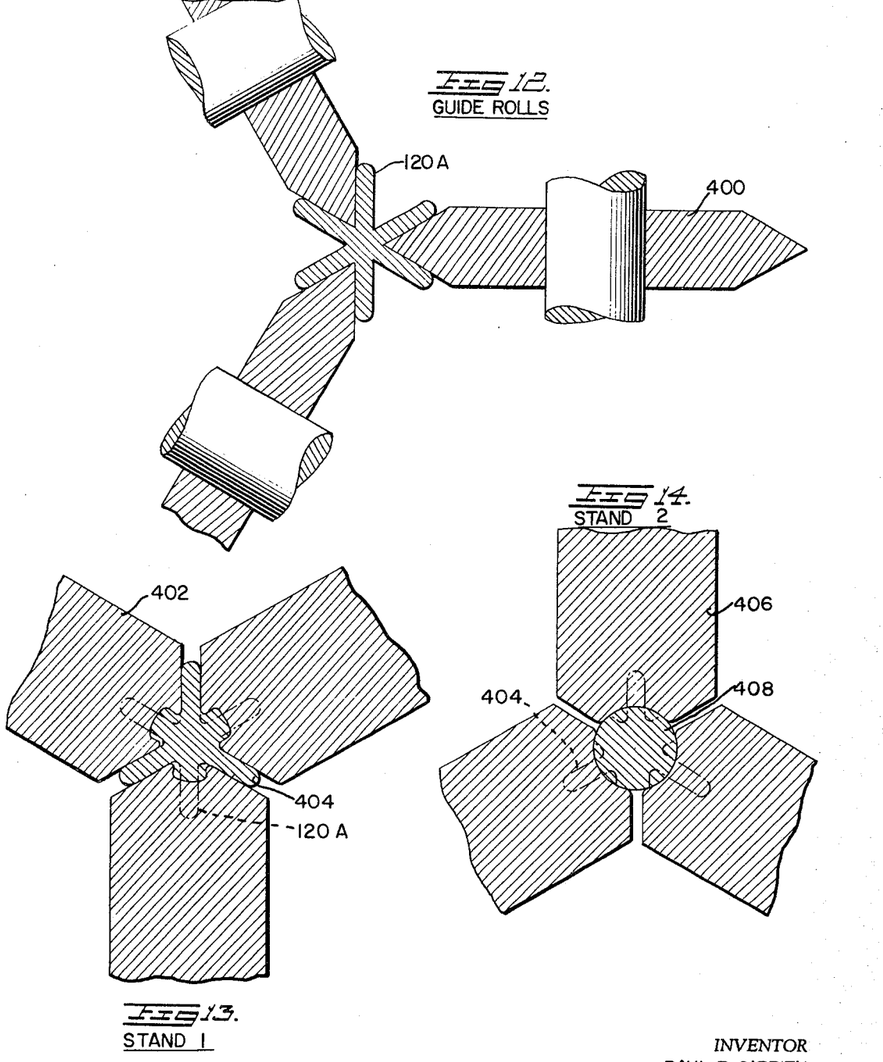
FIGURES 12–22 are semi-diagrammatic, fragmentary, sectional views of sequential tandem breakdown mill stands according to the invention.
Figures 15, 16:
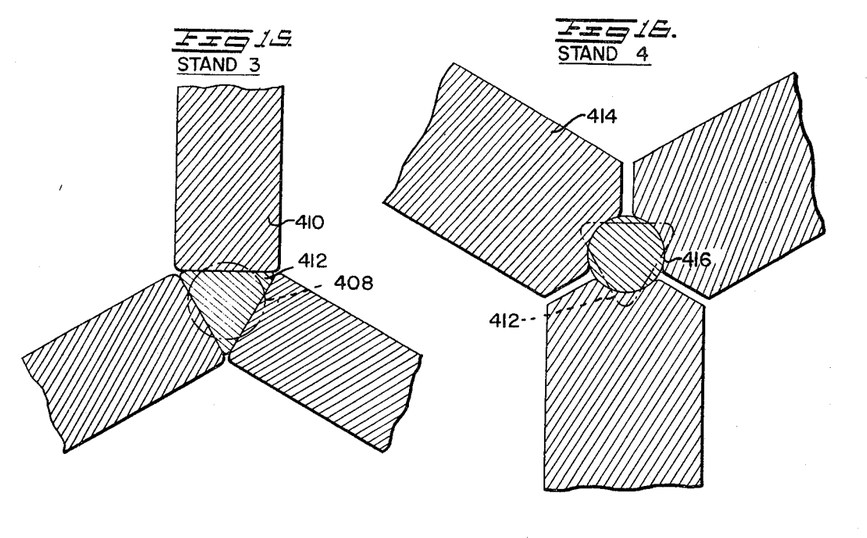

Tangential trim station 124, which is shown in FIGURES 9 to 11, performs essentially the same function as stationary cutters 238 in the alternative embodiment of the invention shown in FIGURE 6, i.e., trimming the outer portion from the preliminary star-shaped section. Six roll stands 300 are adjustably mounted on a suitable support frame (not shown) equiangularly about a horizontal axis. Rotatably mounted within each stand 300 is a spindle 302 secured to two spur gears 304 and a hardened and ground high-strength steel trimming roll 306 interposed therebetween. Each roll 306 has a guiding surface 308 whose major portion is defined by a pair of conical frustums each having a 60 degree conical angle and a maximum, 8 inch diameter base in common, as is shown in FIGURE 10. Guiding surfaces 308 are curved inwardly toward the adjacent roll 306 to terminate in sharp cutting edges 310. Adjacent cutting edges 310 of adjacent rolls 306 contact each other in the plane of the spindle 302 axes, thereby forming a closed guiding pass 312 having outwardly extending legs 314. Guiding pass 312 is dimensioned so as to correspond to the thoroughly compacted and welded portion 120A of section 120. Spaced spur gears 316 secured to shaft 318 of each of six variable speed synchronous electric motors 320 mesh with spur gears 304 and fit closely with the side faces of trimming rolls 306. Thus motors 320 drive trimming rolls 306 at the same speed in direction 322 with cutting edges 310 converging upon the incoming horizontal section 120. Motors 320 and roll stands 300 are adjustably mounted upon the support frame (not shown) so that trimming rolls 306 can be moved inwardly toward the center of pass 312 in order to compensate for the metal removed from the rolls 306 during the sharpening of cutting edges 310.

It will be understood that in the tangential trim station the number, shapes and sizes of the rolls may vary to correspond with those of the tangential compacting rolls, and that different power sources and transmissions may be used, without departing from the invention.

In the operation of tangential trim station 124, section 120 is fed into pass 312 with rolls 306 operating at a surface speed corresponding to that of section 120. Cutting edges 310 converge upon the legs of section 120 close to the interface between thoroughly compacted and welded portion 120A and poorly compacted and welded portion 120B, and trim the latter from the former with the trimmed material becoming scrap from which new pellets 100 can be cast. This trimming operation removes any burrs or other irregularities from the ends of the legs of section 120A, thereby forming a smooth surface. Rolls 306 may be cooled by suitable coolant baths or sprays (not shown).

The breakdown mill

Referring now to FIGURES 12 to 22, breakdown mill 132 comprises a number of sequential tandem mill stands mounted on a suitable base with their passes centered on a common horizontal axis. Adjustable gearbox 134 permits the three rolls of each stand to be driven at a different predetermined speed from those of other stands. Alternatively, each stand may be driven individually, as mentioned above, thereby facilitating adjustment for different metals section 120A (or 121A or 122) cross-section, or percent area reduction.

Upon entering breakdown mill 132, section 120A (or 121A or 122) passes first between three idler guide rolls 400, which rotationally orient the section with respect to the rolls of the successive stands. The area of the incoming section of this particular example will be about 0.475 sq. in., it being understood that this cross-section can vary greatly within the scope of the invention. The speed of 100 feet per minute will be used for purposes of illustration, it being understood that this speed also can vary greatly and desirably will be increased to the maximum permissible for each particular metal or alloy starting material. Each successive roll stand crushes, kneads, and works the workpiece into a different cross-section, as is shown in FIGURES 13 to 22. The workpiece does not rotate while passing through breakdown mill 132. The rolls of each stand may be oppositely oriented (i.e., at an angle of 60 degrees) with respect to the rolls of the stands preceding and following it, as is indicated by the orientation of the respective figures.

Rolls 402 of Stand #1 crush inwardly and upset alternate legs of star-shaped section 120A (or 121A or 122) to form section 404. Rolls 406 of Stand #2 crush inwardly and upset the remaining legs of section 404, forming a 0.775 inch diameter rod circular 408. Rolls 410 of Stand #3 upset circular rod 408, forming delta-shaped section 412. Rolls 414 of Stand #4 upset delta-shaped section 412 to re-form it into a 0.775 inch diameter circular rod 416. Rolls 418 of Stand #5 upset circular rod 416 into a delta-shaped section 420 oriented at 60 degrees with respect to the previous delta-shaped section 412. Rolls 422 of Stand #6 upset delta-shaped section 420 to reform it into a 0.775 inch diameter circular rod 424. It will be noted that during the operations performed by Stands #1 through #6, the cross-sectional area of the workpiece does not change. Thus there has been substantially no elongation, substantially all of the work imparted by the rolls has been in the form of further compacting, crushing, and kneading the metal, and the speed of the workpiece has remained substantially constant. It will be noted further that the design of the roll passes prevent the compressed metal from "lapping" onto itself.

Figures 17, 18:
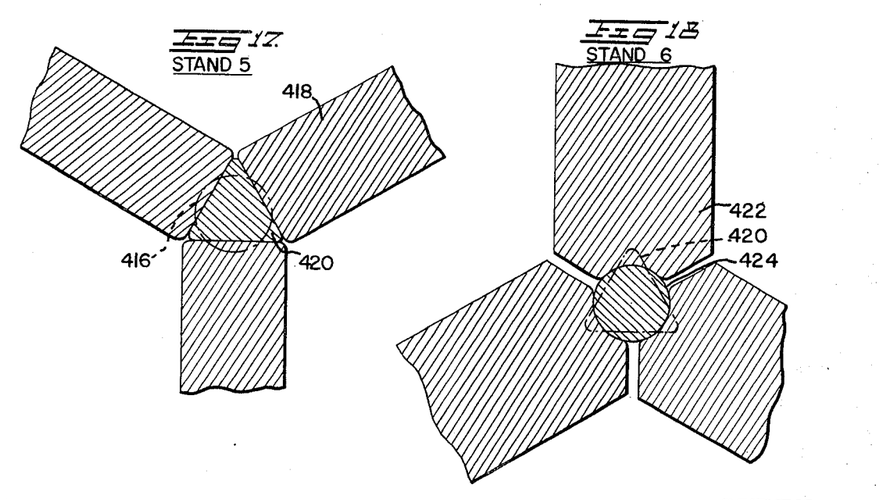
Figure 19:
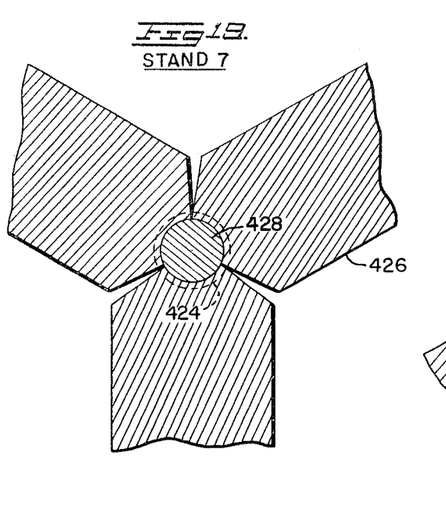
Figure 20:
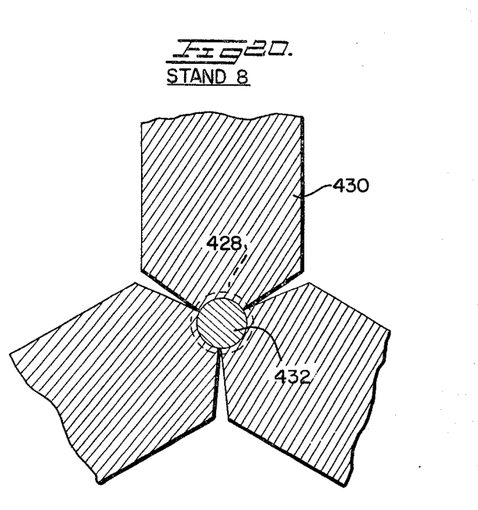

After Stand #6, each successive stand elongates the workpiece in addition to working it. Rolls 426 of Stand #7 reduce circular rod 424 to circular rod 428 of 0.625 inch diameter (0.306 sq. in. area). Rolls 430 of Stand #8 reduce circular rod 428 to circular rod 432 of 0.500 inch diameter (0.196 sq. in. area). Rolls 434 of Stand #9 reduce circular rod 432 to circular rod 436 of 0.375 inch diameter (0.110 sq. in. area).

Figure 21:
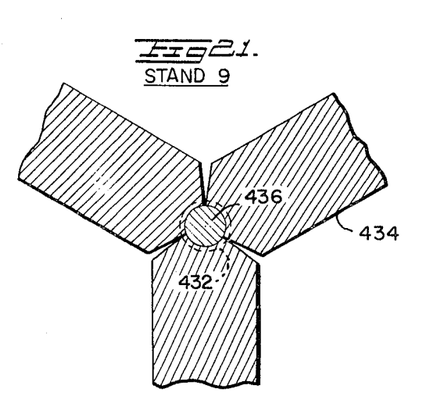
Figure 22:
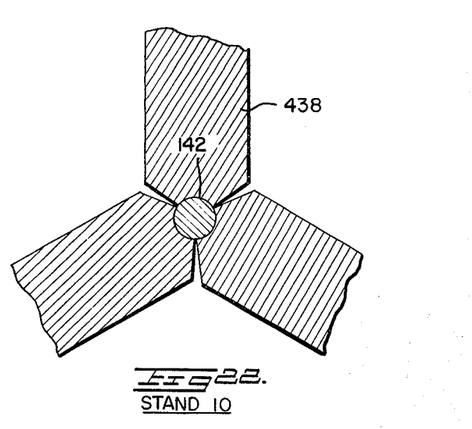
Figure 23:
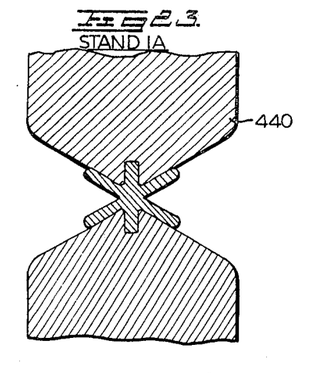
FIGURES 23–28 are views similar to FIGURES 12–22, but showing an alternate embodiment of the invention.
Figure 24:
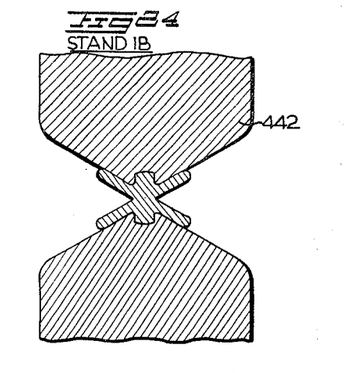
Figure 25:
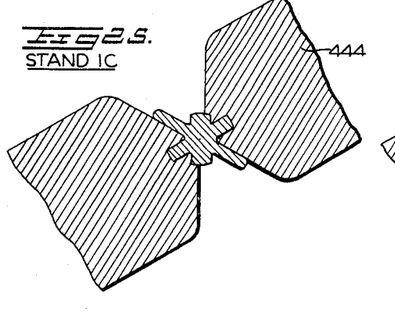
Figure 26:
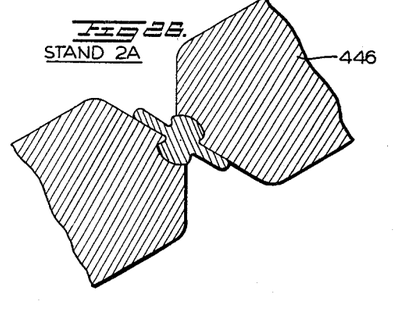
Figure 27:
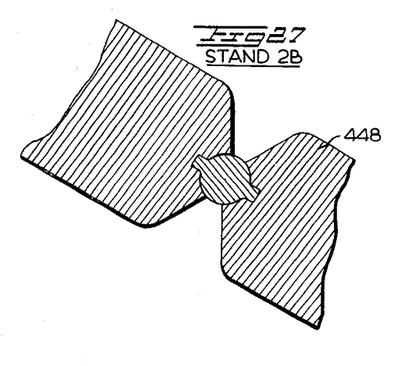
Figure 28:
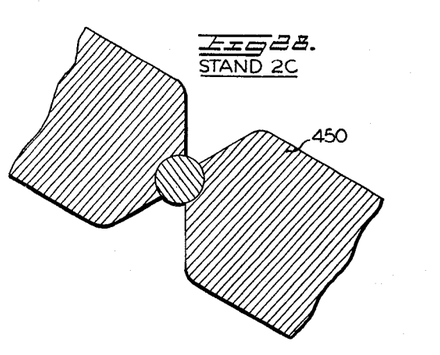

Finally, ⅜ inch diameter rod 436 passes through finishing rolls 438 to produce finished ⅜ inch diameter rod 142 at a final workpiece speed of 450 feet per minute. Obviously this final speed will be increased proportionally when the incoming speed of section 120A (or 121A or 122) is increased; for example, where section 120A (or 121A or 122) enters breakdown mill 132 at 300 feet per minute, rod 142 will emerge at about 1350 feet per minute.

It will be understood that the number and type of roll stands in breakdown mill 132 can be varied without departing from the invention. For example, the outwardly extending legs of section 120A (or 121A or 122) need not be completely upset at a single stand, but may be partially upset at one or more stands and finally upset at a subsequent stand; as shown in FIGURES 23 to 28, sequential tandem mill Stands #1A, #1B, #1C, #2A, #2B, and #2C having respectively rolls 440, 442, 444, 446, 448, and 450 may be substituted for Stands #1 and #2 described above. Alternatively, it may be possible to omit some of the mill stands, as for example, #3, #4, #5, and #6. In addition, by appropriate roll pass design, the preliminary elongated configuration with the thin, outwardly extending legs may have cross-sections other than a star-shape, and thereby can be finally converted into products other than a circular rod. Moreover, the outwardly extending legs need not be of uniform thickness, but, for example, their thickness may vary as a function of radius.

As suggested by the above-mentioned U.S. Patent 3,076,706, various modifications of the invention will be obvious, such as feeding pellets of different alloys into tangential compacting mill 132 to produce various core and cladding effects. Moreover, one or more solid metal wires can be fed into mill 132 at the center of pass 212 so that pellets 100 will be compacted and welded together and to the wire so as ultimately to produce an integral bimetallic bar having a core of the metal of the wire bonded to a surrounding thickness of solid metal formed from the pellets. Examples of such core metal are high tensile steel, aluminum, or copper. Of course, the core metal must have a yield or elongation capability approximately equal to that of the metal of the pellets, since the two must elongate together during the reduction passes.

While present preferred embodiments of the invention have been illustrated and described, it will be understood that the invention may be otherwise variously embodied and practiced within the scope of the following claims.

What is claimed is:
1. The method of producing a wrought metal bar of substantially uniform density comprising the steps of compacting metal particles into a preliminary elongated configuration having a plurality of relatively thin, outwardly extending legs, and thereafter compressing and deforming said legs inwardly.

2. The method according to claim 1 wherein said legs are compressed and deformed sequentially.

3. The method according to claim 1 wherein there are an even number of said legs and groups of symmetric legs are compressed and deformed sequentially.

4. The method according to claim 1 wherein said configuration has a generally star-shaped cross-section.

5. The method according to claim 1 wherein said particles are preheated aluminous particles substantially all of which are coarser than 200 mesh.

6. The method of producing a wrought metal bar of substantially uniform density comprising the steps of compacting metal particles into a preliminary elongated configuration having a plurality of relatively thin, outwardly extending legs, trimming metal from the ends of said legs, and thereafter compressing and deforming said legs inwardly to produce an elongated convex configuration.

7. The method according to claim 6 comprising the further step of deforming said elongated convex configuration, thereby increasing its length and decreasing its cross-sectional area.

8. A method of producing wrought metal bar of substantially uniform density comprising the steps of:
feeding heated metal particles into a star-shaped pass of a compacting mill which compacts, crushes and welds said particles into a preliminary elongated configuration having the shape of said pass; and
passing said preliminary elongated configuration into a breakdown mill which further compresses and deforms inwardly the legs of said configuration.

9. The method according to claim 8 wherein symmetric groups of said radially outwardly extending legs are compressed and deformed inwardly in succession at additional passes of differing shapes, thereby crushing, kneading, and working the metal thereof into an elongated convex configuration.

10. The method according to claim 9 wherein said compression and deformation of the outwardly extending legs also increases the length and decreases the cross sectional area of the convex configuration.

11. The method of claim 8, whrein said particles are preheated aluminous particles substantially all of which are coarser than 200 mesh.

12. The method of producing a wrought metal bar of substantially uniform density comprising the steps of:
  preheating aluminous metal particles, substantially all of which are coarser than 200 mesh, to a temperature in the range of between about 450° F. and the incipient melting temperature of the aluminous metal;
  introducing said particles into a vertical hopper of a compacting mill having several rolls arranged with their axes of rotation in a common, substantially horizontal plane intersecting their work surfaces to define directly beneath said hopper a pass of a star shape having relatively thin, radially outwardly extending legs;
  discharging said particles from said hopper in said temperature range and in free-flowing condition, while rotating said rolls so that their work surfaces converge inwardly upon said particles, thereby compacting, crushing, and welding said particles into a preliminary, elongated configuration having the shape of said pass and including a central thoroughly compacted and welded portion and an outer portion at the ends of its legs;
  trimming said outer portion from the ends of said legs of said preliminary, elongated configuration;
  passing said preliminary, elongated configuration into a breakdown mill having a plurality of successive roll stands, whereby in a first arrangement of said stands, each successive stand compresses and deforms inwardly a group of symmetric legs of said configuration, thereby crushing, kneading, and working the metal thereof into an elongated convex configuration; and whereby a subsequent arrangement of said stands deforms said elongated convex configuration, thereby increasing its length and decreasing its cross-sectional area.

13. The method of claim 12 wherein said steps are performed upon continuous work material.

References Cited
UNITED STATES PATENTS
2,994,917    8/1961    Fritsch _____________ 75—214

CARL D. QUARFORTH, *Primary Examiner.*

BENJAMIN R. PADGETT, *Examiner.*

A. J. STEINER, *Assistant Examiner.*